United States Patent
Jäschke et al.

(10) Patent No.: US 10,828,810 B2
(45) Date of Patent: Nov. 10, 2020

(54) METHOD FOR THE PRODUCTION OF A VEHICLE BODY ELEMENT AND VEHICLE BODY ELEMENT

(71) Applicant: AUDI AG, Ingolstadt (DE)

(72) Inventors: Anja Jäschke, Beilngries (DE); Mario Boehme, Beilngries (DE)

(73) Assignee: AUDI AG, Ingolstadt (DE)

( * ) Notice: Subject to any disclaimer, the term of this patent is extended or adjusted under 35 U.S.C. 154(b) by 379 days.

(21) Appl. No.: 15/102,805

(22) PCT Filed: Nov. 27, 2014

(86) PCT No.: PCT/EP2014/003181
§ 371 (c)(1),
(2) Date: Jun. 8, 2016

(87) PCT Pub. No.: WO2015/086118
PCT Pub. Date: Jun. 18, 2015

(65) Prior Publication Data
US 2016/0318220 A1    Nov. 3, 2016

(30) Foreign Application Priority Data

Dec. 9, 2013 (DE) .................. 10 2013 022 247

(51) Int. Cl.
*B29C 44/18* (2006.01)
*B62D 29/00* (2006.01)
(Continued)

(52) U.S. Cl.
CPC .......... *B29C 44/188* (2013.01); *B62D 29/002* (2013.01); *B29C 44/186* (2013.01);
(Continued)

(58) Field of Classification Search
CPC . B29C 44/04; B29C 44/0461; B29C 44/0469; B29C 44/0476; B29C 44/0492;
(Continued)

(56) References Cited

U.S. PATENT DOCUMENTS

| 4,422,990 A | * | 12/1983 | Armstrong | ............ A01G 24/60 |
| | | | | 264/45.3 |
| 4,468,363 A | * | 8/1984 | Miessler | ............... B29C 44/386 |
| | | | | 249/107 |

(Continued)

FOREIGN PATENT DOCUMENTS

| DE | 39 32 121 | 4/1991 |
| DE | 197 54 180 | 6/1998 |

(Continued)

OTHER PUBLICATIONS

International Search Report issued by the European Patent Office in International Application PCT/EP2014/003181.

*Primary Examiner* — Seyed Masoud Malekzadeh
*Assistant Examiner* — Sonny V Nguyen
(74) *Attorney, Agent, or Firm* — Henry M. Feiereisen LLC

(57) ABSTRACT

A method for the production of a vehicle body element is disclosed, wherein the vehicle body element is provided as a component composite comprised of at least one carrier profile part having a hollow structure, and a lightweight material, for example plastic. A liquid starting component of the lightweight construction material is introduced into the hollow structure of the carrier profile part and is then cured to forms the component composite.

9 Claims, 3 Drawing Sheets

(51) Int. Cl.
  *B29K 105/00* (2006.01)
  *B29C 44/44* (2006.01)
  *B29C 44/38* (2006.01)
  *B29K 105/04* (2006.01)
  *B29K 105/16* (2006.01)
  *B29K 705/00* (2006.01)
  *B29L 31/30* (2006.01)

(52) U.S. Cl.
  CPC ............ *B29C 44/38* (2013.01); *B29C 44/385* (2013.01); *B29C 44/44* (2013.01); *B29C 44/445* (2013.01); *B29K 2105/04* (2013.01); *B29K 2105/16* (2013.01); *B29K 2105/251* (2013.01); *B29K 2705/00* (2013.01); *B29K 2995/0063* (2013.01); *B29L 2031/3002* (2013.01)

(58) Field of Classification Search
  CPC ... B29C 44/1128; B29C 44/118; B29C 44/18; B29C 44/186; B29C 44/3442; B29C 44/3461; B29C 44/36; B29C 44/38; B29C 44/385; B29C 44/386; B29C 44/44; B29C 44/445; B29C 44/10; B29C 44/105; B29C 44/188; B29C 44/0415; B29C 44/0407; B29C 45/0013; B29C 45/1816; B29C 2045/0089; B29C 2045/0091
  USPC .......................... 425/4 R, 4 C, 817 R, 817 C
  See application file for complete search history.

(56) References Cited

U.S. PATENT DOCUMENTS

| | | | |
|---|---|---|---|
| 4,922,596 A | 5/1990 | Wycech | |
| 4,995,545 A | 2/1991 | Wycech | |
| 5,489,405 A | 2/1996 | Holbert et al. | |
| 5,633,017 A * | 5/1997 | Sebag | B29C 33/36 249/160 |
| 5,803,004 A * | 9/1998 | Swann | B63B 39/005 114/61.1 |
| 5,911,542 A * | 6/1999 | Obrock | B63B 3/06 114/267 |
| 6,213,540 B1 * | 4/2001 | Tusim | B29C 44/22 296/187.02 |
| 6,379,595 B1 * | 4/2002 | Byma | B29C 44/0461 264/112 |
| 7,180,027 B2 | 2/2007 | Hable et al. | |
| 7,214,003 B1 * | 5/2007 | Lux, III | E02B 7/16 405/104 |
| 2002/0171163 A1 * | 11/2002 | Barsby | B29C 44/0492 264/45.9 |
| 2005/0049329 A1 * | 3/2005 | Faulkner | C08J 9/0085 523/218 |
| 2007/0045886 A1 * | 3/2007 | Johnson, Sr. | B29C 44/128 264/40.1 |
| 2011/0104473 A1 * | 5/2011 | Tippur | B29C 44/1276 428/319.1 |
| 2015/0115640 A1 | 4/2015 | Jaeschke | |

FOREIGN PATENT DOCUMENTS

| | | |
|---|---|---|
| DE | 198 50 372 | 5/2000 |
| DE | 199 37 375 | 2/2001 |
| DE | 10 2006 056 136 | 5/2008 |
| DE | 10 2012 001 647 | 8/2013 |
| EP | 1 925 417 | 5/2008 |
| EP | 1 745 908 | 9/2009 |
| EP | 2 511 087 | 10/2012 |

* cited by examiner

Section I-I

METHOD FOR THE PRODUCTION OF A VEHICLE BODY ELEMENT AND VEHICLE BODY ELEMENT

CROSS-REFERENCES TO RELATED APPLICATIONS

This application is the U.S. National Stage of International Application No. PCT/EP2014/003181, filed Nov. 27, 2014, which designated the United States and has been published as International Publication No_ WO 2015/086118 and which claims the priority of German Patent Application, Serial No. 10 2013 022 247.8, filed Dec. 9, 2013, pursuant to 35 U.S.C. 119(a)-(d).

BACKGROUND OF THE INVENTION

The invention relates to a method for the production of a vehicle body element, and to such a vehicle body element.

In the automotive industry, specific requirements have to be met in terms of component stability, when i.a. crash-sensitive components, such as nodal points or a vehicle column, are involved. This is normally realized through increase in material thicknesses of sheet metal parts with a corresponding increase in the component weight.

In general, the use of plastic structural parts is known, which have a reduced component weight in comparison to the sheet metal parts. For example, EP 1745908 B1 discloses a hollow structural component having a fiber-reinforced plastic and being produced by way of an RTM process. Furthermore, DE 10 2006 056 136 A1 discloses a lightweight molded part for use in the automotive industry, having a core portion of a lightweight composite material, which is composed of a matrix material and lightweight filler material integrated therein. Installation of such plastic structural parts in a vehicle body is, however, very complicated in terms of manufacture.

SUMMARY OF THE INVENTION

The object of the invention is to provide a method for the production of a vehicle body element in which the shape stability of the vehicle body, in particular in the event of a crash, can be increased in a simple manner in terms of manufacture.

According to one aspect of the invention, the object is attained by a method for the production of a vehicle body element, which is provided as a composite component comprised of at least one carrier profile part having a hollow structure and made of a lightweight material, such as plastic, wherein the lightweight material is introduced into the hollow structure of the carrier profile part to form the composite component.

According to another aspect of the invention, the object is attained by a vehicle body element, which is produced in particular by a method as set forth above, and is a component composite comprised of at least one carrier profile part, having a hollow structure, and a lightweight material, wherein the hollow structure of the carrier profile part is filled, at least partially, with the lightweight material.

Preferred refinements of the invention are disclosed in the subclaims.

The invention is primarily applicable for the production of a composite component made of a plastic, in particular a structural plastic foam, and a metal sheet part. In the following, the features of the invention relate therefore in particular to this material selection. However, the same features of the invention also apply to other combinations of materials, such as an organic sheet metal part, having a hollow structure in which, for example, a plastic is introduced. As an alternative, a metal sheet part may be included, having a hollow structure in which a liquid starting component of a light metal material is cast by way of a casting process.

According to the invention, a carrier profile part may involve a metal sheet part with a hollow structure in which at least partially a liquid starting component of a lightweight material, in particular a plastic, is introduced. Subsequently, the lightweight material cures within the hollow structure of the sheet metal part, while forming the component composite.

According to a particularly preferred variant, the plastic can be a structural foam which can be foamed under pressure and heat. In terms of a simple process design, the liquid starting component can be injected directly into the hollow structure of the sheet metal part and foamed therein. The liquid plastic starting component is therefore not initially foamed in a separate process step in a foaming tool and then introduced into the hollow structure of the sheet metal part but foamed directly in the hollow structure of the sheet metal part. In this way, a material joint with the supporting sheet metal part is realized as the structural foam is produced, specifically in a common process step. The hollow structure of the sheet metal part thus directly forms a cavity into which the liquid starting component of the plastic is injected.

In terms of a further weight reduction of the body element, lightweight filler pellets may be incorporated in the structural foam. The lightweight filler pellets may be provided, by way of example, in the form of hollow bodies, such as acrylic glass spheres, lightweight pellets of foamed glass or clay, mineral foam pellets, metal foam pellets, or the like. In general, all cellular composite materials can be used, which have a reduced density compared with structural foam. The foaming process is, preferably, executed at a process temperature which is lower than the melting temperature of the lightweight filler pellets.

According to another configuration, the sheet metal part can be configured with a cup-shaped cross section, having an open hollow structure. In this case, the open hollow structure can be closed in a foam-tight manner in a foaming process with a foaming tool. Subsequently the liquid starting component of the structural foam can be injected into the cavity via a feed channel that is integrated in the foaming process, and foamed therein.

In the above process sequence, a foaming tool must be provided, which is configured specifically for a foam-tight closure of the open hollow structure of the sheet metal part. According to an alternative which is simpler in terms of manufacture, the hollow structure of the sheet metal part may also have a closed cross section, whereby the feed channel for injecting the liquid starting component of the structural foam can be integrated in a wall which delimits the hollow structure. In this case, the need for a foaming tool may thus be eliminated.

For a process-reliable production of the body element, it is preferred when the lightweight filler pellets are introduced in a first process step, preferably prior to injecting the liquid structural foam starting component, into the hollow structure of the sheet metal part as loose bulk material. Subsequently, in a second process step, the liquid structural foam starting component is injected into the hollow structure and expanded therein.

The hollow structure of the sheet metal part can also be subdivided into several sub-chambers. These can be filled, depending on the desired component shape stability, in different amount distributions with the lightweight filler pellets. This results in a body element with locally varying density and/or locally different shape stability.

Preferably, the lightweight pellets can be introduced directly in a mixing head to the liquid component of the lightweight material. This enables a homogeneous mixing and wetting of the material as well as a precise metering of the particle fraction.

The advantageous configurations and/or refinements of the invention, as described above and/or set forth in the subclaims, can—except, for example, in cases of unambiguous dependencies or incompatible alternatives—be used individually or in any combination with each other.

BRIEF DESCRIPTION OF THE DRAWING

The invention and its advantageous configurations and/or refinements as well as its advantages are explained in more detail hereinafter with reference to drawings.

It is shown in.

DETAILED DESCRIPTION OF PREFERRED EMBODIMENTS

Figure 1:
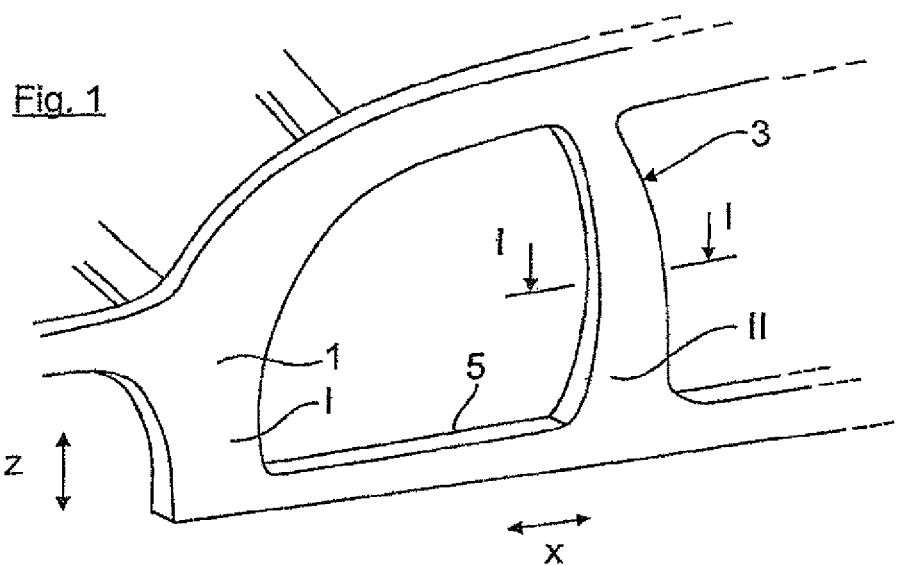
FIG. 1 a perspective partial view of a side structure of a vehicle body.

FIG. 1 depicts roughly schematically a side structure of a vehicle body, specifically with an A column 1 and a B column 3, which are connected to one another at the bottom side via a door sill 5 which extends in the vehicle longitudinal direction x. The door sill 5 is attached at the nodes I, II to the A column 1 and the B column 3, respectively. FIG. 1 and also FIGS. 2 to 8 are provided in terms of easy understanding of the invention. Therefore, the figures are merely roughly simplified representations that do not reflect a realistic configuration of the vehicle body.

Figure 2:
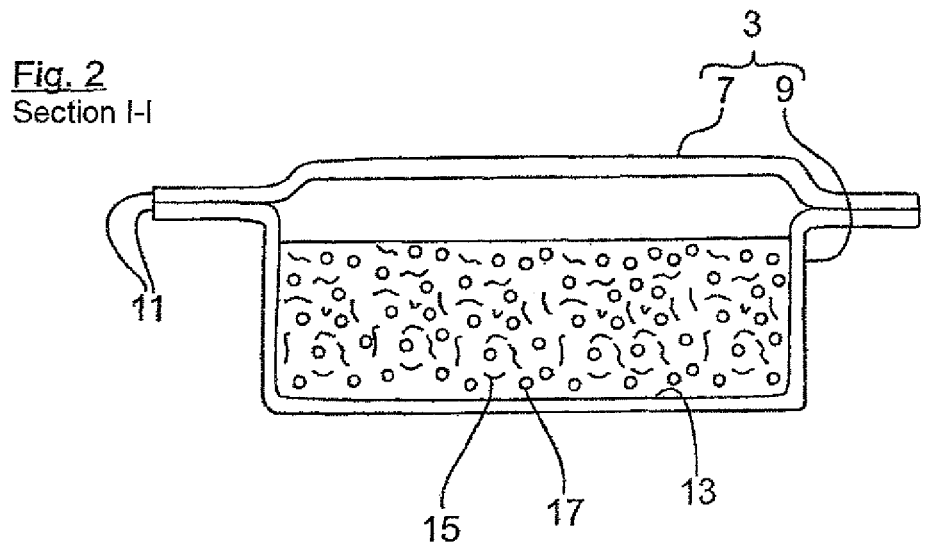
FIG. 2 a sectional view of the B column of the vehicle body along the section plane I-I of FIG. 1.

As is apparent from FIG. 2, the B column 3 is constructed with an inner sheet metal part 7 and an outer sheet metal part 9, which are joined to one another at marginal flanges 11 via spot welding, for example. The outer sheet metal part 9 is U shaped in cross section, specifically with a profile base and vertical side walls there from, which together define an open hollow structure. 13. The outer sheet metal part 9 also acts as a carrier profile part which is joined together with a structural plastic foam 15 to a single-piece composite component. The structural plastic foam 15 is arranged in the hollow structure 13 of the outer sheet metal part. 9 In addition, the structural plastic foam 15 has integrated therein lightweight filler pellets 17. As is apparent from FIG. 2, the injected structural plastic foam 15 surrounds the lightweight filler pellets 17.

Figure 3:
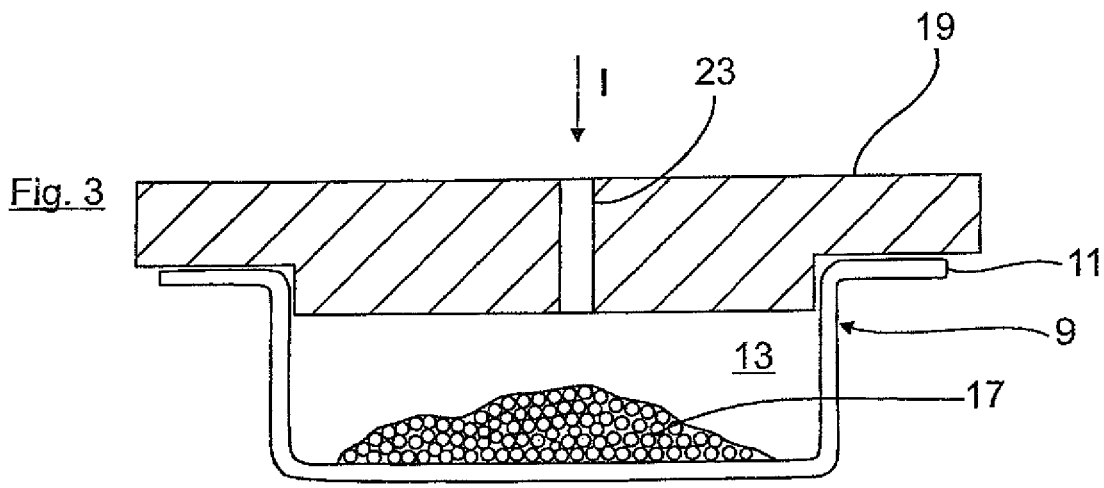
FIGS. 3 to 5 respective views illustrating the method for the production of the body element shown in FIG. 2.
Figure 4:
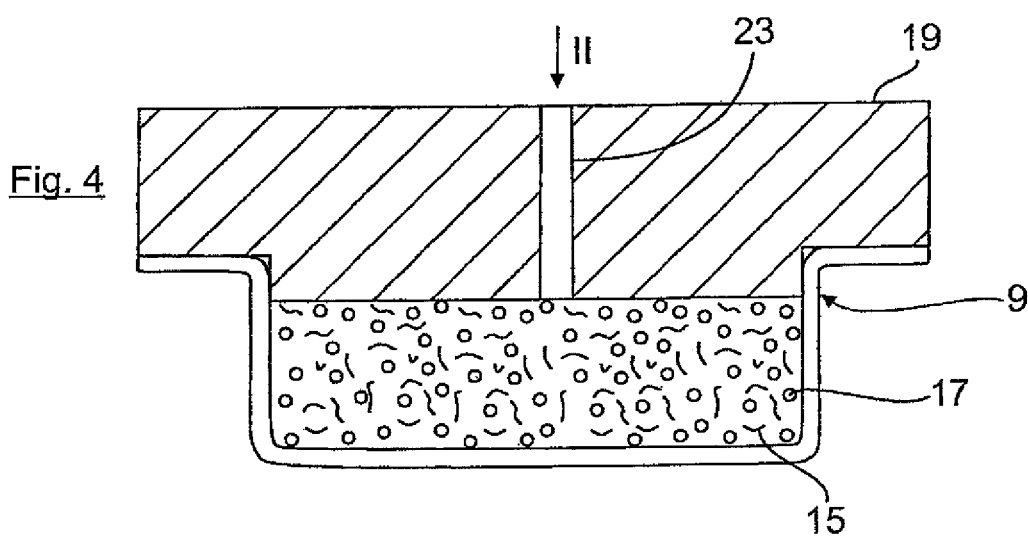
Figure 5:
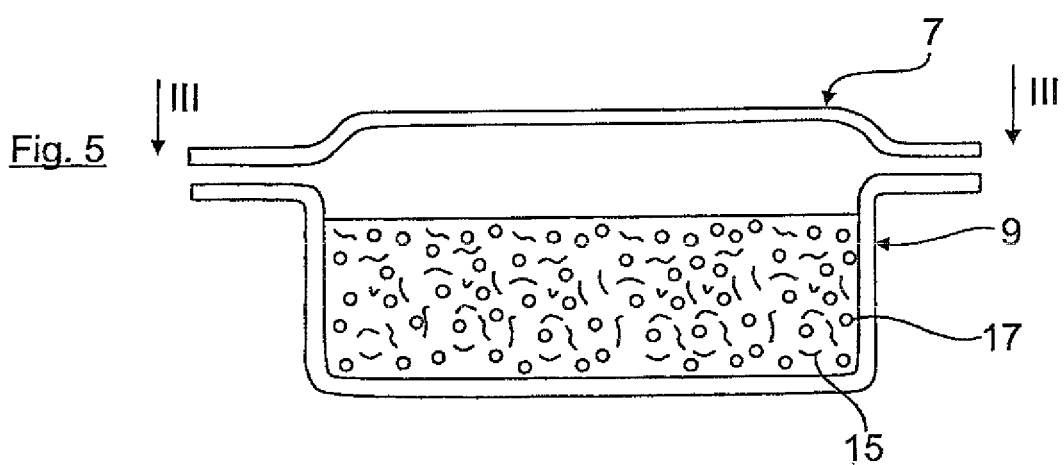

In the following, the method for the production of the B column 3 is described with reference to FIGS. 3 and 4. Accordingly, the outer sheet metal part 9 is initially preformed, for example in a deep-drawing process, to form the hollow structure 13. Subsequently, the outer sheet metal part 9 is transferred to a not shown foaming facility, in which the hollow structure 13 of the outer sheet metal part 9 is filled in a foaming process with the structural plastic foam 15. In the foaming process, the open cross section of the hollow structure 13 is initially covered by a foaming tool 19 (FIGS. 3 and 4) in a foam-tight manner. The foaming tool 19 further includes a feed channel 23, through which the lightweight filler pellets 17 and the liquid starting component of the plastic foam 15 can be introduced into the cavity.

Subsequently, the lightweight filler pellets 17 are introduced in a first process step I (FIG. 3) as bulk material into the hollow structure 13 of the outer sheet metal part 9. In a further process step II (FIG. 4), the liquid starting component of the structural plastic foam 15 is then injected under heat and pressure into the cavity, defined by the foaming tool 19 and the outer sheet metal part 9, and foamed therein. After the structural plastic foam 15 has cured, the single-piece composite component 5, shown in FIG. 5 and comprised of the outer sheet metal part 9 and the structural plastic foam 15, is realized. In a subsequent process step III (FIG. 5), the inner sheet metal part 7 is then joined by spot welding to the connecting flanges 11 of the outer sheet metal part 9.

The lightweight filler pellets 17 have a reduced density in comparison to the structural plastic foam 15, so that the component weight of the B column 3 is reduced. The foaming process is executed at a process temperature that is lower than the melting temperature of the lightweight filler pellets 17.

Figure 6:
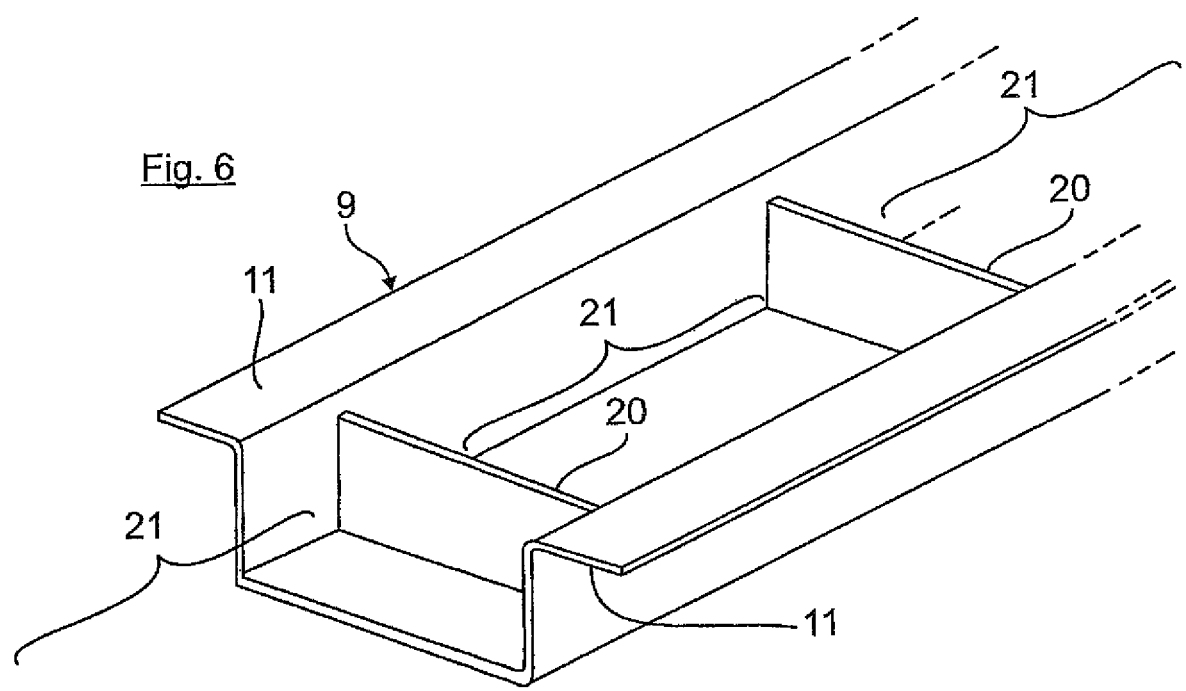
FIG. 6 a perspective partial view of the outer sheet metal part of the B column in isolation.

FIG. 6 shows a perspective illustration of the outer sheet metal part 9. Accordingly, bulkhead parts 20 are placed in the open hollow structure 13 of the outer sheet metal part 9 to subdivide the hollow structure 13 into separate sub-chambers 21. Each of these individual sub-chambers 21 can be filled with a different bulk amount of lightweight filler pellets 17. In this way, the foaming process results in a composite component having a locally different density as well as a locally different shape stability. The bulkhead parts 20 are preferably designed such that the thus delimited sub-chambers 21 are fluidly connected to each other. During the foaming process, the liquid starting component of the structural plastic foam 15 can therefore easily flow into all sub-chambers 21.

Figure 7:
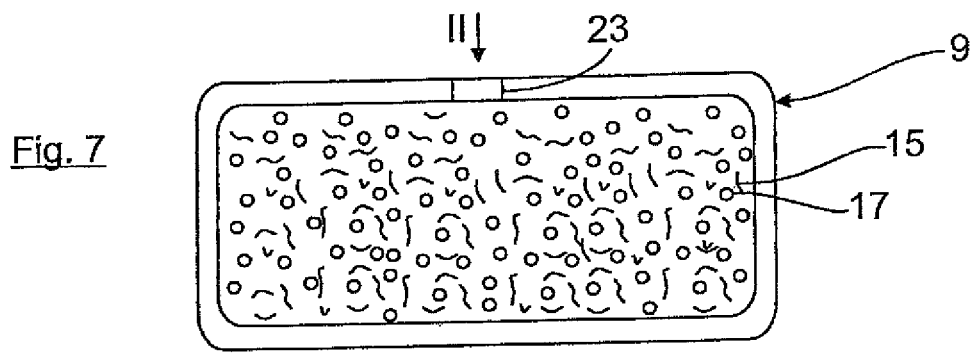
FIGS. 7 and 8 respective views illustrating a production method according to a second exemplary embodiment.
Figure 8:
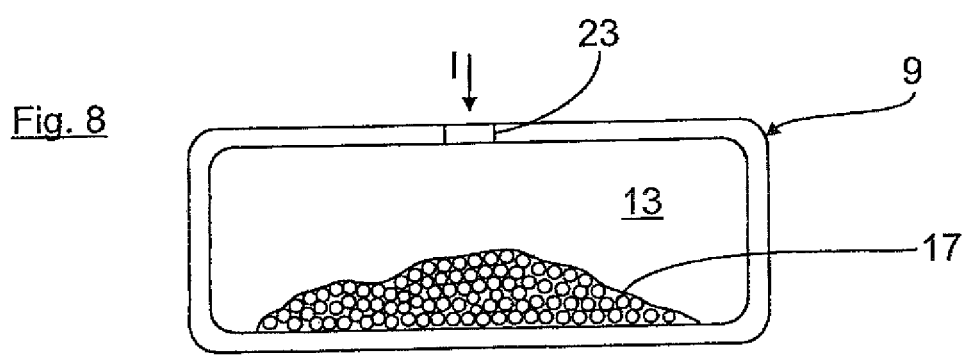

With reference to FIGS. 7 and 8, a further exemplary embodiment of the production method according to the invention is described. Accordingly, the hollow structure 13 of the carrier profile part 9 is, unlike in the preceding figures, not with open profile but rather closed. Provided in a wall, which delimits the hollow structure 13, is the feed channel 23 via which both the lightweight filler pellets 17 and the structural plastic foam 15 is introduced into the hollow structure 13. In this way, the need for an additional foaming tool 19 can be eliminated which is beneficial in terms of manufacture.

By introducing the plastic foam structure 15 into the hollow structure 13 of the sheet metal part, the strength of the component composite is substantially increased. In general, the invention is applicable to regions of a vehicle body, which are exposed to great stress in the event of a crash and where there is a risk that they may not withstand great crash stress.

What is claimed is:

1. A method for the production of a vehicle body element, comprising:
    first introducing lightweight filler pellets as loose bulk material into a hollow structure of at least one carrier profile part, followed by
    introducing into the hollow structure of the at least one carrier profile part a lightweight material made from structural plastic foam having a liquid starting component which undergoes a foaming process under increased pressure and heat to produce a composite component; and thereafter integrating the lightweight filler pellets in the structural plastic foam, wherein the liquid starting component is directly injected into the hollow structure of the at least one carrier profile part and foamed, and subdividing the hollow structure of the at least one carrier profile part into sub-chambers each separated by a bulkhead part and fluidly connected to each other, each said bulkhead part being lower than the at least one carrier profile part, and filling the sub-chambers in dependence on a desired component shape stability in different quantity distributions with the lightweight filler pellets, wherein the liquid starting component flows into all of the sub-chambers.

2. The method of claim 1, wherein the structural plastic foam is a 2-component structural foam.

3. The method of claim 1, wherein the lightweight filler pellets are a material selected from the group consisting of cellular composite material, expanded glass pellets, hollow glass spheres, mineral foam pellets, and metal foam pellets, said lightweight filler pellets having a density which is smaller than a density of the structural plastic foam.

4. The method of claim 1, wherein the foaming process is executed at a process temperature which is lower than a melting temperature of the lightweight filler pellets.

5. The method of claim 1, further comprising connecting the lightweight material and the at least one carrier profile part to one another by a material joint.

6. The method of claim 1, wherein the at least one carrier profile part is a sheet metal part, and the lightweight material is a plastic.

7. The method of claim 1, wherein the at least one carrier profile part is cup-shaped with the hollow structure being open, and further comprising closing the open hollow structure of the at least one carrier profile part, after the foaming process, by a further profile part to form the vehicle body element.

8. The method of claim 1, wherein the at least one carrier profile part is cup-shaped with the hollow structure being open, and further comprising closing the open hollow structure of the at least one carrier profile part during the foaming process by a foaming tool, with the liquid starting component being injected into the hollow structure via at least one feed channel in the foaming tool.

9. The method of claim 1, wherein the hollow structure of the at least one carrier profile part has a profile that is closed and further comprising providing a feed channel directly in the at least one carrier profile part for introducing the liquid starting component.

\* \* \* \* \*